(12) United States Patent
Mihai et al.

(10) Patent No.: US 11,645,626 B2
(45) Date of Patent: May 9, 2023

(54) METHODS AND APPARATUS FOR ASSESSING DIVERSITY BIAS IN ALGORITHMIC MATCHING OF JOB CANDIDATES WITH JOB OPPORTUNITIES

(71) Applicant: iCIMS, Inc., Holmdel, NJ (US)

(72) Inventors: Adrian Mihai, Dublin (IE); Shiying Chen, Highland Park, NJ (US)

(73) Assignee: iCIMS, Inc., Holmdel, NJ (US)

( * ) Notice: Subject to any disclaimer, the term of this patent is extended or adjusted under 35 U.S.C. 154(b) by 0 days.

(21) Appl. No.: 17/376,665

(22) Filed: Jul. 15, 2021

(65) Prior Publication Data

US 2023/0026042 A1   Jan. 26, 2023

(51) Int. Cl.
*G06Q 10/00* (2012.01)
*G06N 3/00* (2006.01)
*G06Q 30/00* (2012.01)
*G06Q 10/1053* (2023.01)
*G06N 3/08* (2023.01)
*G06Q 30/0201* (2023.01)

(52) U.S. Cl.
CPC ........... *G06Q 10/1053* (2013.01); *G06N 3/08* (2013.01); *G06Q 30/0201* (2013.01)

(58) Field of Classification Search
CPC ......................................... G06Q 10/00–50/00
USPC ................................. 705/7.11–7.42
See application file for complete search history.

(56) References Cited

U.S. PATENT DOCUMENTS

| | | | |
|---|---|---|---|
| 8,818,910 B1 * | 8/2014 | Liu | G06Q 10/1053 |
| | | | 705/321 |
| 10,438,135 B2 | 10/2019 | Larsen et al. | |
| 2011/0238591 A1 * | 9/2011 | Kerr | G06Q 10/1053 |
| | | | 705/321 |
| 2011/0313940 A1 * | 12/2011 | Kerr | G06Q 10/1053 |
| | | | 705/321 |
| 2014/0122355 A1 | 5/2014 | Hardtke et al. | |
| 2020/0134569 A1 * | 4/2020 | Taylor | G06F 16/9535 |
| 2020/0233910 A1 * | 7/2020 | Bhide | G06F 40/205 |

(Continued)

FOREIGN PATENT DOCUMENTS

JP    2019519021 A    7/2019

OTHER PUBLICATIONS

Chen Le, et al., "Investigating the Impact of Gender on Rank in Resume Search Engines," CHI 2018, Apr. 21-26, 2018, Montreal, QC, Canada, DOI: https://doi.org/10.1145/3173574.3174225, 1-14.

(Continued)

*Primary Examiner* — Mustafa Iqbal
(74) *Attorney, Agent, or Firm* — Cooley LLP (57) ABSTRACT

In some embodiments, a method can include receiving a set of job descriptions and a set of candidate profiles. Each job description is associated with a first subset of candidate profiles from the set of candidate profiles. The method can further include executing a model to identify, from the first subset of candidate profiles, a second subset of candidate profiles that satisfy a fit metric and a third subset of candidate profiles that does not satisfy the fit metric. The method can further include calculating a bias metric based on a true positive value, a false positive value, a true negative value, and a false negative value that were calculated based on auditing the second subset of candidate profiles and the third subset of candidate profiles. The method can further include updating the set of job descriptions based on the bias metric.

20 Claims, 2 Drawing Sheets

(56) References Cited

U.S. PATENT DOCUMENTS

2020/0372304 A1    11/2020    Kenthapadi et al.
2020/0372472 A1*  11/2020    Kenthapadi ............ G06N 20/20
2021/0097471 A1*   4/2021    Inamdar ................. G06N 20/00

OTHER PUBLICATIONS

Model Validation Consortium, "Machine Learning Models Workshop I: Methods for Detecting & Correcting Bias," 2020, 1-77.
International Search Report and Written Opinion for International Application No. PCT/US2022/037285, dated Oct. 20, 2022, 18 pages.

* cited by examiner

```
Generate a set of job descriptions.  201
```

Receive, during a hiring process for the set of job descriptions, a set of candidate profiles. At least some of the candidate profiles from the set of candidate profiles include at least one attribute from a set of protected classes. Each job description is associated with a first subset of candidate profiles from the set of candidate profiles.  202

Execute, during the hiring process for the set of job descriptions, a model to identify a second subset of candidate profiles from the first subset of candidate profiles that satisfy a fit metric and a third subset of candidate profiles from the first subset of candidate profiles that does not satisfy the fit metric.  203

Audit, during the hiring process for the set of job descriptions, the second subset of candidate profiles and the third subset of candidate profiles to generate a true positive value and a false positive value for the second subset of candidate profiles, and a true negative value and a false negative value for the third subset of candidate profiles.  204

Calculate, during the hiring process for the set of job descriptions, a first bias metric and a second bias metric based on the true positive value, the false positive value, the true negative value, and the false negative value.  205

Update, during the hiring process for the set of job descriptions and after calculating the first bias metric and the second bias metric, the set of job descriptions based on the first bias metric and the second bias metric.  206

FIG. 2

METHODS AND APPARATUS FOR ASSESSING DIVERSITY BIAS IN ALGORITHMIC MATCHING OF JOB CANDIDATES WITH JOB OPPORTUNITIES

TECHNICAL FIELD

The present disclosure relates to the field of data processing and artificial intelligence including, for example, apparatus and methods for assessing diversity bias (e.g., racial bias, gender bias, etc.) in algorithmic matching of job candidates with job opportunities.

BACKGROUND

Known apparatus and methods of matching job candidates with job opportunities can use algorithms that filter out candidate profiles (e.g., resumes) from job opportunities. Such algorithms, however, are often prone to diversity bias including, for example, gender bias, racial bias, and/or the like. As a result of that diversity bias, these algorithms can filter out candidates of a specific race and/or a specific gender that can potentially be a good fit for the job opportunities. In a competitive industry, filtering out such candidates by an organization can pose a competitive threat or disadvantage to that organization. Thus, a need exists for apparatus and methods to assess diversity bias in algorithmic matching of job candidates with job opportunities.

SUMMARY

In some embodiments, a method can include receiving a set of job descriptions and a set of candidate profiles. Each job description is associated with a first subset of candidate profiles from the set of candidate profiles. The method can further include executing a model to identify, from the first subset of candidate profiles, a second subset of candidate profiles that satisfy a fit metric and a third subset of candidate profiles that does not satisfy the fit metric. The method can further include calculating a bias metric based on a true positive value, a false positive value, a true negative value, and a false negative value that were calculated based on auditing the second subset of candidate profiles and the third subset of candidate profiles.

DETAILED DESCRIPTION

Non-limiting examples of various aspects and variations of the embodiments are described herein and illustrated in the accompanying drawings.

Although some known empirical models, computer algorithms, and/or machine learning models are useful in matching job candidates with job opportunities, they, nevertheless, can be prone to bias and can therefore be unfair at least occasionally. Fairness in algorithmic matching of job candidates with job opportunities can result in more equitable outcomes and better business outcomes within an organization (e.g., a diverse team that can bring new perspectives, attract new clients, and/or the like). Currently, no known or established baseline or consensus exists around a measure of fairness in matching job candidates with job opportunities. Some known apparatus and methods for defining fairness in algorithmic matching of job candidates are stochastic (random) processes that sample hired candidates and can be biased in defining fairness.

One or more embodiments described herein generally relate to apparatus and methods of assessing bias in algorithmic matching of job candidates with job opportunities during a hiring process. To solve the above-mentioned challenges in measuring fairness in algorithmic matching of job candidates, the algorithmic matching of job candidates in apparatus and methods described herein can use, for example, an empirical model, a machine learning model, a statistical model, and/or the like to select candidates for a job description during the hiring process. The hiring process can begin, for example, with generating a job description for a job opportunity and can end, for example, with selecting one or more candidates to whom an offer is made for the job opportunity.

As described herein, assessing fairness of the hiring process and/or diversity bias in the hiring process, during the hiring process, would allow a company to make adjustments to the hiring process (e.g., update a job description) during hiring process. and obtain the desired hiring result. Otherwise, when assessment of hiring process and/or diversity bias is done after the hiring process, a human resource (HR) team have to wait for hiring results of the hiring process, assess whether the HR team made the targets, and make adjustment to a next hiring process after the hiring process.

One or more of the bias assessment apparatus and methods described herein qualitatively assess diversity bias (e.g., racial diversity bias, gender diversity bias, etc.) in algorithmic matching of job candidates with job opportunities during a hiring process and using a job candidate selection algorithm (e.g., a machine learning model). The diversity assessments conducted by the one or more of the bias assessment apparatus and methods can produce a metric (also referred to as the "diversity score") that is considered a measure of fairness of job candidate selection algorithm with respect to diversity (e.g., racial diversity, gender diversity, and/or the like) of the job candidates.

While the methods and apparatus are described herein as processing data from document files, text files, scanned images, image files, and/or the like, in some instances a bias assessment device (e.g., bias assessment device 101 described below in connection with FIG. 1) can be used to generate the document files, the text files, the scanned images, the image files, and/or the like. For example, in some instances, the bias assessment device can generate a job description document (e.g., a job description file in a portable document format (PDF) format, an Office Open Extensible Markup Language (docx) format, etc.) during a hiring process. The bias assessment device can also update the job description document to produce, during the hiring process, an updated job description that can reduce, during the hiring process, bias in selecting candidates.

Figure 1:
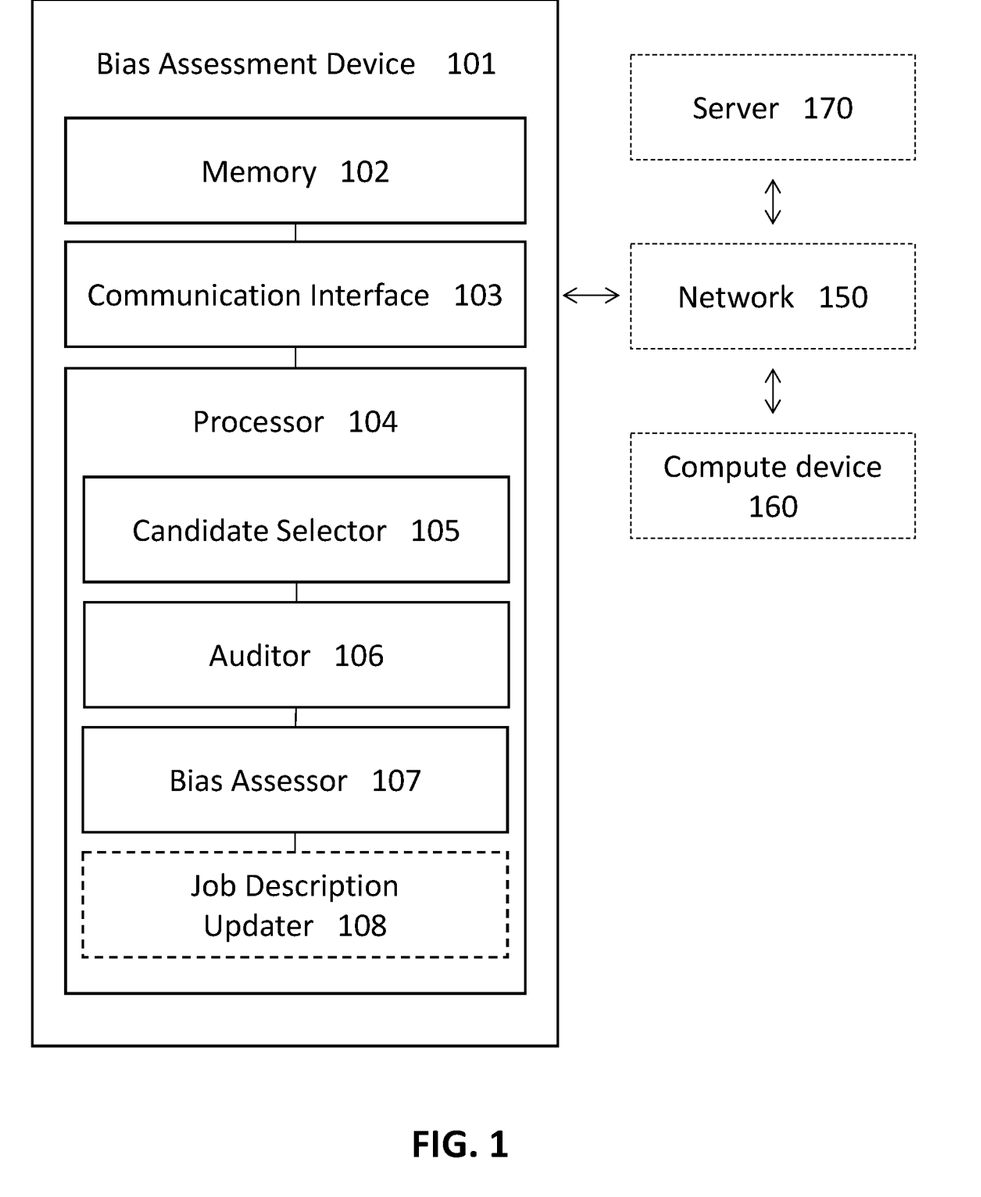
FIG. 1 is a schematic description of a bias assessment device, according to an embodiment.

FIG. 1 is a schematic description of a bias assessment device 101 (also referred to as the "hiring device"), according to an embodiment. The bias assessment device 101 can optionally be coupled to a compute device 160 and/or a server 170, to transmit and/or receive data, audit response, machine learning models, analytical models, and/or the like, via a network 150. The bias assessment device 101, the compute device 160, and the server 170 each can be/include a hardware-based computing device and/or a multimedia device, such as, for example, a computer, a desktop, a laptop, a smartphone, and/or the like. The bias assessment device 101 includes a memory 102, a communication interface 103, and a processor 104. The bias assessment device 101 can operate a candidate selector 105, an auditor 106, and a bias assessor 107 that collectively can assess diversity bias (e.g., racial diversity bias, gender diversity bias, etc.) in algorithmic matching of job candidates with job opportunities during a hiring process. Moreover, in some implementations, the bias assessment device 101 can operate a job description updater 108 that can update (e.g., to reduce diversity bias) a job description based on the assessed diversity bias.

The bias assessment device 101 can receive, via the communication interface 103, data including, for example, one or more representations of candidate profiles, one or more representations of job candidate resume documents (e.g., a resume document file), one or more representation of job descriptions (e.g., a job posting link), and/or the like, from a data source(s) including for example, the server 170, the compute device 160, a peripheral device such as a scanner and/or an external hard drive (both optional; not shown), and/or the like. In some implementations, the bias assessment device 101 can generate all or a subset of the one or more representations of job candidate resume documents, all or a subset of the one or more representations of job candidate resume documents, all or a subset of the one or more representation of job descriptions, and/or the like. The data received from the data source(s) can be stored in the memory 102 of the bias assessment device 101 and be processed or analyzed using the processor 104. The bias assessment device 101 can begin receiving the data in response to a user (e.g., a hiring manager, a business owner, a human resource team member, etc.) of the bias assessment device 101 and/or the compute device 160 providing an indication to begin a hiring process.

The memory 102 of the bias assessment device 101 can be, for example, a memory buffer, a random-access memory (RAM), a read-only memory (ROM), a hard drive, a flash drive, and/or the like. The memory 102 can store, for example, the one or more representations of candidate profiles, the one or more representations of job candidate resume documents, the one or more representation of job descriptions, codes that includes instructions to cause the processor 104 to perform one or more processes or functions (e.g., as performed by a candidate selector 105, an auditor 106, and/or a bias assessor 107), models (e.g., empirical models, machine learning models, etc.), and/or the like. The memory 102 can store a set of files associated with (e.g., generated by executing) the candidate selector 105, the auditor 106, and/or the bias assessor 107. For example, the candidate selector 105 can include a machine learning model, and files associated with the candidate selector 105 can include temporary variables, return memory addresses, variables, a graph of the machine learning model (e.g., representations of a set of arithmetic operations), the graph's metadata, assets (e.g., external files or pointers to external files), electronic signatures (e.g., specifying a type of the machine learning model and the input/output tensors), a list of selected candidates, memory addresses of the list of selected candidates, and/or the like, generated during the operation of the candidate selector 105.

The communication interface 103 of the bias assessment device 101 can be a hardware component of the bias assessment device 101 to facilitate data communication between the bias assessment device 101 and external devices (e.g., the network 150, the compute device 160, the server 170, and/or the like). The communication interface 103 is operatively coupled to and used by the processor 104 and/or the memory 102. The communication interface 103 can be, for example, a network interface card (NIC), a Wi-Fi® transceiver, a Bluetooth® transceiver, an optical communication module, and/or any other suitable wired and/or wireless communication interface. The communication interface 103 can be configured to connect the bias assessment device 101 to and facilitate receiving and/or transmitting data via to the network 150. For example, the communication interface 103 can facilitate receiving or transmitting the one or more representations of candidate profiles, the one or more representations of job candidate resume documents, the one or more representation of job descriptions, the codes, models, and/or the like, from/to the compute device 160, or the server 170, each communicatively coupled to the bias assessment device 101 via the network 150.

The network 150 can be, for example, a digital telecommunication network of servers and/or compute devices. The servers and/or computes device on the network can be connected via one or more wired or wireless communication networks (not shown) to share resources such as, for example, data storage and/or computing power. The wired or wireless communication networks between servers and/or compute devices of the network 150 can include one or more communication channels, for example, a radio frequency (RF) communication channel(s), a fiber optic commination channel(s), an electronic communication channel(s), and/or the like. The network 150 can be and/or include, for example, the Internet, an intranet, a local area network (LAN), and/or the like.

The processor 104 can be, for example, a hardware-based integrated circuit (IC) or any other suitable processing device configured to run or execute a set of instructions or a set of codes. For example, the processor 104 can include a general-purpose processor, a central processing unit (CPU), an application specific integrated circuit (ASIC), a graphics processing unit (GPU), and/or the like. The processor 104 is operatively coupled to the memory 102 through a system bus (for example, address bus, data bus, and/or control bus; not shown) and can read, for example, first data, first codes, and/or first models stored in the memory 102 and/or write second data, second codes, and/or second models to the memory 102. In one example, the processor 104 can read a representation of job descriptions and a set of resume documents, and can analyze the representation of job descriptions and the set of resume documents to produce a representation of an updated job description (e.g., bias free/bias-reduced job description), and write the representation of the updated job description to the memory 102.

The processor 104 includes the candidate selector 105, the auditor 106, and the bias assessor 107. The processor 104 can further optionally include a job description updater 108. Each of the candidate selector 105, the auditor 106, the bias assessor 107, and the job description updater 108 can include software stored in the memory 102 and executed by the processor 104. For example, a code to cause bias assessor 107 to generate a bias metric for selection of a set of job candidates (e.g., one job candidate, two job candidates, ten job candidates, twenty job candidates, hundred job candidates, two hundred job candidates, and/or the like) for a job description can be stored in the memory 102 and executed by the processor 104. Alternatively, each of the candidate selector 105, the auditor 106, the bias assessor 107, and job description updater 108 can be a hardware-based device (e.g., an integrated circuit).

The candidate selector 105 can receive the data (e.g., the one or more representations of candidate profiles, the one or more representations of job candidate resume documents, the one or more representation of job descriptions, and/or the like) from the memory 102 and/or from external resources (the server 170, the compute device 160, and/or the like) via the communication interface 103. In some instances, the candidate selector 105 can be configured to prepare (e.g., render or generate) from the data a set of candidate profiles (resume document image files, PDF files, DOCX files, and/or the like) that have a standardized format. Furthermore, in some instances, the candidate selector 105 can be configured to prepare (generate), from the data, a set of job descriptions that have a standardized format. The standardized format can establish common attributes (e.g., a common background color, a common font, etc.), and therefore, improve cost efficiency and accuracy of analyzing the set of candidate profiles. The standardized format of the set of job candidate profiles can further improve cross-compatibility of the set of candidate profiles among various software codes, processes, and/or models of the bias assessment device 101. Moreover, a common format for the set of candidate profiles can be easier to audit by a user(s) of the bias assessment device 101. In some instances, the candidate selector 105 can receive the resume documents that are often semi-structured and/or unstructured, generate resume document images, and identify and correlate entities (e.g., company names, individual names, skills, job titles, universities, etc.) in generic text of the resume document images to extract structured and machine-indexable data.

In some instances, the candidate selector 105 can further synthetically generate augmented images from the set of candidate profiles and/or the set of job descriptions to diversify representations of the set of candidate profiles and, for example, increase a number of images for training a machine learning model of the candidate selector 105. In some instances, synthetically generating (also referred to as "augmenting") the set of candidate profiles and/or the set of job descriptions may involve manipulating brightness of an image of a candidate profile, adding noise (e.g., a random noise) to the image, white-balancing the image, translating a text of a candidate profile, synonym-replacing the text, and/or the like. In some instances, augmenting the set of candidate profiles may involve randomly permuting the set of candidate profiles. In some instances, augmenting the set of candidate profiles may involve changing one or more attributes of protected classes (e.g., gender, race, national origin, religion, etc.) associated with each candidate profiles from the set of candidate profiles.

The set of candidate profiles can include at least one attribute from protected classes. The protected classes can include, for example, a protected class(es) based on gender, a protected class(es) based on pregnancy, a protected class(es) based on race, a protected class(es) based on age, a protected class(es) based on disability, a protected class(es) based on color, a protected class(es) based on creed, a protected class(es) based on national origin, a protected class(es) based on religion, or a protected class(es) based on genetic information. For example, in some instances, the set of candidate profiles can include an attribute that indicates, for example, a gender (e.g., male, female, etc.) of each candidate, a race of each candidate, a national origin of each candidate, and/or the like, from the set of candidate profiles.

The candidate selector 105 can analyze, using a model (e.g., a rule-based model, a machine learning model, and/or the like), the set of candidate profile and the set of job descriptions to identify and/or select a subset of candidate profiles from the set of candidate profiles (e.g., that satisfy a fit metric). In some implementations, the model is a machine learning model (e.g., a deep neural network model (DNN), an artificial neural network (ANN) model, a fully connected neural network, a convolutional neural network (CNN), a residual network model, a region proposal network (RPN) model, a feature pyramid network (FPN) model, a generative adversarial network (GAN), a K-Nearest Neighbors (KNN) model, a Support Vector Machine (SVM), a decision tree, a random forest, an analysis of variation (ANOVA), boosting, a Naïve Bayes classifier, and/or the like) that includes a set of model parameters (e.g., weights, biases, activation functions, and/or the like) that can be executed to identify and/or select a subset of candidate profiles. In some implementations, the machine learning model of the candidate selector 105 can identify and/or classify paragraphs of structured, semi-structured, and/or unstructured resume document images (e.g., to correctly classify candidate profiles regardless of a language(s) of and/or a spelling error(s) in the documents) as described in U.S. patent application Ser. No. 17/319,894, filed on May 13, 2021 and entitled "Machine Learning Based Classification and Annotation of Paragraph of Resume Document Images Based on Visual Properties of the Resume Document Images, and Methods and Apparatus for the Same," which is incorporated herein in its entirety by this reference.

The auditor 106 is operatively coupled to the candidate selector 105 and bias assessor 107 and is optionally coupled to the job description updater 108. The auditor 106 audits, during the hiring process for the set of job descriptions, the subset of candidate profiles selected from the set of candidates by the candidate selector 105 and generates a true positive value, a false positive value, a true negative value, and a false negative value. In some instances, for example, each of the true positive value, the false positive value, the true negative value, and the false negative value can be a real number between 0 and 1. In some instances, a number of candidate profiles from the subset of candidate profiles selected (e.g., by the machine learning model) from the set of candidates, for fitness to a job description, is larger than a number of hiring goal, and therefore, are not hired at this stage. On the other hand, in some instances, the number of candidate profiles from the subset of candidate profiles selected from the set of candidates, for fitness to the job description, is equal to or less than the number of hiring goal.

The true positive value (TP; also referred to as the "probability of detection" or the "hit rate") represents a number for candidates selected (e.g., predicted to be a good fit by the candidate selector 105) algorithmically from the set of candidates and by the candidate selector 105, that are confirmed to be true by the auditor 106.

The false positive value (FP; also referred to as the "probability of false alarm" or the "fall-out") represents a number for candidates selected (e.g., shortlisted or to be hired) algorithmically from the set of candidates and by the candidate selector 105, that are determined to be false by the auditor 106.

The true negative value (TN) represents a number for candidates not selected (e.g., not shortlisted or not to be hired) algorithmically from the set of candidates and by the candidate selector 105, that are confirmed to be true by the auditor 106.

The false negative value (FN) represents a number for candidates not selected (e.g., not shortlisted or not to be hired) algorithmically from the set of candidates and by the candidate selector 105, that are determined to be false by the auditor 106.

In some implementations, the auditor 106 can prompt, during the hiring process, a user(s) of the bias assessment device 101, a user(s) of the server 170, and/or a user(s) of the compute device 160, to determine if selecting a candidate from the subset of candidate profiles was true or false. Similarly, in some instances, the user can also determine if not selecting a candidate from the subset of candidate profiles was true or false. In some implementations, the auditor 106 can include an auditor model (e.g., an auditor model specifically programmed and/or trained to audit a hiring decision outcome or a candidate selection outcome) that can be used, during the hiring process, to determine if selecting the candidate from the subset of candidate profiles was true or false and/or not selecting the candidate from the subset of candidate profiles was true or false.

The bias assessor 107 is operatively coupled to the candidate selector 105 and the auditor 106 and is optionally coupled to the job description updater 108. The bias assessor 107 receives the true positive value, the false positive value, the true negative value, and the false negative value from the auditor 106 and calculate at least one bias metric for selection of the subset of candidate profiles. The at least one bias metric can be a measure of equalized odds of selection of the subset of job candidates from the set of job candidates across multiple protected classes, as described below. The equalized odds here refer to:

(a) a first true positive value for a first protected class (e.g., female) is equal to or substantially similar to a second true positive value for a second protected class (e.g., male); and/or (b) a first false positive value for the first protected class is equal to or substantially similar to a second false positive value for the second protected class.

In some implementations, the bias assessor 107 can calculate a first bias metric (also referred to as the "inclusiveness metric") and a second bias metric (also referred to as the "fair start metric") for selection of the subset of candidate profiles. To calculate the first bias metric, a true positive rate (TPR) and a false positive rate (FPR) are calculated. TPR is calculated using a true positive value (TP) and a false negative value (FN) by the equation:

$$TPR = \frac{TP}{TP + FN}$$

FPR is calculated using a false positive value (FP) and a true negative value (TN) by equation:

$$FPR = \frac{FP}{FP + TN}$$

The TPR and the FPR can be calculated for a first protected class and a second protected class from the multiple protected classes. For example, $TPR_1$ is calculated using a true positive value for the first protected class ($TP_1$) and a false negative value for the first protected class ($FN_1$) by equation:

$$TPR_1 = \frac{TP_1}{TP_1 + FN_1},$$

$FPR_1$ is calculated using a false positive value for the first protected class ($FP_1$) and a true negative value for the first protected class ($TN_1$) by equation:

$$FPR_1 = \frac{FP_1}{FP_1 + TN_1},$$

$TPR_2$ is calculated using a true positive value for the first protected class ($TP_2$) and a false negative value for the first protected class ($FN_2$) by equation:

$$TPR_2 = \frac{TP_2}{TP_2 + FN_2},$$

$FPR_2$ is calculated using a false positive value for the first protected class ($FP_2$) and a true negative value for the first protected class ($TN_2$) by equation:

$$FPR_2 = \frac{FP_2}{FP_2 + TN_2}.$$

The first bias metric can be then calculated by equation:

$$\text{metric} = \left(\frac{\mu_{TPR}^{-1} + \mu_{FPR}^{-1}}{2}\right)^{-1}$$

where $\mu_{TPR}$ is the mean true positive rate for N jobs and is calculated by equation:

$$\mu_{TPR} = \frac{\sum_{i=1}^{N} |TPR_1 - TPR_2|_i}{N}$$

and $\mu_{FPR}$ is the mean false positive rate for N jobs and is calculated by equation:

$$\mu_{FPR} = \frac{\sum_{i=1}^{N} |FPR_1 - FPR_2|_i}{N}$$

The first bias metric can be a value between 0 and 1. Value 0 represents a fair selection process (e.g., a fair candidate selector 105, a fair job description, etc.) and value 1 represents an unfair selection process (e.g., an unfair candidate selector 105, an unfair job description, etc.). In some instances, the first bias metric value can be adjusted (e.g., normalized, added by a factor, etc.) to be in any ranges (e.g., from 0 to 100, from 1 to 2, etc.) to facilitate user interpretability of the first bias metric. Although in the above example, the first bias metric is calculated based on TPR and the FPR for the first protected class and the second protected class, in some instances, the first bias metric can be calculated based on TPR and the FPR for more protected classes (e.g., 5 protected classes based on candidate profiles received across 5 different races).

As an additional metric or an alternative metric to the first bias metric, the bias assessor 107 can further calculate a second bias metric (also referred to as the "fair start metric"). The second bias metric can be a relaxed variant (e.g., involving reduced number calculation by the bias assessor 107 and/or reduced number of auditions by the auditor 106) of the first bias metric. In some instances, for example, the second bias metric can be calculated using the $\mu_{TPR}$ (the mean true positive rate) and is calculated by equation:

$$\mu_{TPR} = \frac{\sum_{i=1}^{N} |TPR_1 - TPR_2|_i}{N}$$

The second bias metric can be considered a measure of quality for equal opportunity. Equal opportunity aims for the outcomes of a selection process (e.g., the subset of candidate profiles selected by the candidate selector 105) to be fair (e.g., result in an equal numbers of candidates selected from the first protected class and the second protected class) towards qualified candidates. For example, the perfect second bias metric would result in equal opportunity with a probability of detection of the first protected class ($TPR_1$) being equal to a probability of detection of the second protected class ($TPR_2$). Therefore, using the second bias metric instead of first bias metric can reduce calculations and/or audits (e.g., involving reduced number calculation by the bias assessor 107 and/or reduced number of audits by the auditor 106) involved in calculating the first bias metric for investigating the probability of false alarms ($FPR_1$ and $FPR_2$).

In some implementations, the processor 104 can optionally include a job description updater 108. The job description updater 108 can be operatively coupled to the candidate selector 105, the auditor 106, and the bias assessor 107. In some instances, the job description updater 108 can include a natural language processing model that can generate an updated job description based on the job description and the first bias metric and/or the second bias metric to reduce a diversity bias in the job description. In some instances, the job description updater 108 can include a model that can generate and/or highlight a set of bias terms in the job description based on the first bias metric and/or the second bias metric. In some instances, the job description updater 108 can generate a signal to display the job description, the first bias metric and/or the second bias metric to a user of the bias assessment device 101, and receive an updated job description from the user of the bias assessment device 101.

The compute device 160 can be/include a hardware-based computing device and/or a multimedia device operatively coupled to the bias assessment device 101. The compute device 160 can be configured to transmit and/or receive data (e.g., resume documents and/or candidate profiles, and/or the like) and/or analytical models to/from the bias assessment device 101. For example, in some implementations, the compute device 160 can be a device of a job candidate that can receive a representation of a job description and transmit a representation of a resume document, a representation of a job candidate profile, and/or the like, to the bias assessment device 101. The user device 160 can include a memory, a communication interface and/or a processor that are structurally and/or functionally similar to the memory 102, the communication interface 103 and/or the processor 104 as shown and described with respect to the bias assessment device 101.

The server 170 can be/include a compute device medium particularly suitable for data storage purpose and/or data processing purpose and can include, for example, a network of electronic memories, a network of magnetic memories, a server(s), a blade server(s), a storage area network(s), a network attached storage(s), deep learning computing servers, deep learning storage servers, and/or the like. The server 170 can include a memory, a communication interface and/or a processor that are structurally and/or functionally similar to the memory 102, the communication interface 103 and/or the processor 104 as shown and described with respect to the bias assessment device 101. In some embodiments, however, the memory of the server 170 can include application specific storage (e.g., deep learning storage servers) that is structurally and/or functionally different from the memory 102. Similarly, in some implementations, the processor of the server 170 can include application specific processors (e.g., GPU rack servers) that are structurally and/or functionally different from the processor 104.

Although the bias assessment device 101, the compute device 160, and the server 170 are shown and described as singular devices, it should be understood that, in some embodiments, one or more bias assessment devices, one or more compute device, and/or one or more server devices can be used in a recognition system. For example, in some instances, multiple job candidates can use multiple compute devices (for example, 100 job candidates use 100 personal computers) to prepare and transmit multiple resume documents and/or candidate profiles to the bias assessment device 101.

In use, the bias assessment device 101 can generate or receive a set of job descriptions (e.g., one or more job descriptions) for a set of job opportunities. In some instances, for example, the compute devices 160 can send an indication of a job opportunity and the bias assessment device 101 can generate a job description for that job opportunity. In some instances, the set of job descriptions can be received or generated, for example, as a text stored in a PDF file, be received as an image in an image file format, and/or any suitable file or format. The bias assessment device 101 can then receive (e.g., from personal computers of job candidates interested in the set of job descriptions), during a hiring process for the set of job descriptions, a set of candidate profiles. At least some of the candidate profiles from the set of candidate profiles can include at least one attribute from a set of protected classes (e.g., race, gender, religion, national origin, etc.). Moreover, each candidate profile from the set of candidate profile can be associated with a job description (applied to the job description). Similarly stated, each job description from the set of job descriptions can be associated with a first subset of candidate profiles from the set of candidate profiles that applied to a job opportunity with that job description.

The bias assessment device 101 can then execute the candidate selector 105 to identify (e.g., to shortlist) a second subset of candidate profiles from the first subset of candidate profiles that satisfy a fit metric and/or a third subset of candidate profiles from the first subset of candidate profiles that does not satisfy the fit metric. In some instances, the bias assessment device 101 can include a rule-based model that generates a fit metric for each candidate profile from the first subset of candidate profiles and based on similarity of that candidate profile to the job description. Therefore, in some instances, the second subset of candidate's profiles with fit metrics above a previously-determined (or predefined) threshold can be selected. Alternatively, in some instances, the second subset of profiles can be a previously-determined number of candidate profiles with highest fit metrics. In some instances, the bias assessment device 101 can include a machine learning model (as described above) that can identify or select the second subset of candidates. Candidate profiles from the first subset of candidate profiles that are not selected by the candidate selector 105 can be considered the third subset of candidate profiles. In contrast, in some instances, the candidate selector 105 can select the third subset of candidate profiles from the first subset of candidate profiles for not satisfying the fit metric and identify the rest of the candidates (the second subset of candidate profiles) from the first subset of candidate profiles not among the third subset of candidate profiles as fit (satisfying the fit metric).

The auditor 106 can receive, during the hiring process for the set of job descriptions, the second subset of candidate profiles and the third subset of candidate profiles from the candidate selector 105. In some instances, the candidate selector 105 can store the second subset of candidate profiles and the third subset of candidate profiles over a period of time (during the hiring process; e.g., 1 day, 2 days, 1 week, 2 weeks, etc.) in the memory 102. Therefore, the auditor 106 can instead, in some instances, receive the second subset of candidate profiles and the third subset of candidate profiles from the memory 102. The auditor 106 can generate a true positive value (TP) and a false positive value (FP) for the second subset of candidate profiles, and a true negative value (TN) and a false negative value (FN) for the third subset of candidate profiles as described above. When the second subset of candidate profiles and the third subset of candidate profiles include candidate profiles from a first protected class (e.g., African Americans) and a second protected class (e.g., LatinX Americans), the auditor 106 can instead generate separate TP, FP, TN, and FN for each of the first protected class and the second protected class:

- a true positive value for a first protected class ($TP_1$),
- a true positive value for a second protected class ($TP_2$),
- a false positive value for the first protected class ($FP_1$),
- a false positive value for the second protected class ($FP_2$),
- a true negative value for the first protected class ($TN_1$),
- a true negative value for the second protected class ($TN_2$),
- a false negative value for the first protected class ($FN_1$), and
- a false negative value for the second protected class ($FN_2$).

The $TP_1$, $FP_1$, $TN_1$, $FN_1$, $TP_2$, $FP_2$, $TN_2$, and $FN_2$ values can be first stored at the memory 102 and then sent to the bias assessor 107 or be directly transmitted to the bias assessor 107. The bias assessor 107 calculates, during the hiring process for the set of job descriptions and as described above, a first bias metric and/or a second bias metric based on the $TP_1$, $FP_1$, $TN_1$, $FN_1$, $TP_2$, $FP_2$, $TN_2$, and $FN_2$. Although, here TP, FP, TN, and FN values are described for the first protected class and the second protected class, the auditor 106 and the bias assessor 107 can calculate the first bias metric and/or the second bias metric for any number of protected classes (e.g., three protected classes, 5 protected classes, 10 protected classes, etc.). Optionally, the job description updater 108 can then update the job description during the hiring process (e.g., before making a hiring decision) as described above to generate an updated job description based on the first bias metric and/or the second bias metric.

In some instances, the updated job description can be posted (e.g., on a career website) to receive additional candidate profiles. Therefore, the above process can be repeated until the first bias metric and the second bias metric indicates a fair hiring process (e.g., having a value above or below a predetermined threshold).

In some instances, the bias assessment device 101 can further identify, during the hiring process for the set of job descriptions (referred to as the "first set of job descriptions" herein), a second set of job descriptions associated and previously applied to using the second subset of candidate profiles (the candidate profiles selected or shortlisted by the candidate selector 105) from the set of candidate profiles (referred to as "the first set of candidate profiles" herein). The second set of job descriptions can be associated to a second set of candidate profiles that can overlap the first set of job description (e.g., commonly include the second subset of candidate profiles). Each job description from the second set of job descriptions can be associated with a fourth subset of candidate profiles from the second set of candidate profiles. The candidate selector 105 can identify, during the hiring process for the first set of job descriptions, (e.g., by executing the machine learning model) a fifth subset of candidate profiles from the second subset of candidate profiles that satisfy the fit metric and a sixth subset of candidate profiles from the first subset of candidate profiles that does not satisfy the fit metric. The auditor 106 can then audit the fifth subset of candidate profiles and the sixth subset of candidate profiles to generate a true positive value and a false positive value for the fifth subset of candidate profiles, and a true negative value and a false negative value for the sixth subset of candidate profiles. The bias assessor 107 can then generate, during the hiring process for the first set of job descriptions, the first bias metric, the second bias metric, an updated first bias metric, and an updated second bias metric based on the true positive value and the false positive value for the fifth subset of candidate profiles, and the true negative value and the false negative value for the sixth subset of candidate profiles. Thereafter, the first set of job descriptions can be updated based on the updated first bias metric and the updated second bias metric. The updated first bias metric and the updated second bias metric both take into account previous job applications of shortlisted candidates during the hiring process. In some implantations, the first bias metric, the second bias metric, the updated first bias metric, and/or the updated second bias metric can be averaged, multiplied, or added to determine an overall fairness metric of the candidate selector 105 (e.g., the machine learning model of the candidate selector 105).

In some implementations, at least one parameter of the model (e.g., the rule-based model, the machine learning model, etc.) of the candidate selector 105 can be tuned, during the hiring process, based on the first bias metric and/or the second bias metric. Once tuned based on the first bias metric and/or the second bias metric, the tuned model can be executed to generate an updated first bias metric or an updated second bias metric that are better (e.g., larger than, indicate lower diversity bias, etc.) than the first bias metric and/or the second bias metric. For example, hyperparameters (e.g., weight, biases, etc.) of the machine learning model of the candidate selector 105 can be trained (e.g., retrained or fine-tuned) based on the first bias metric, the second bias metric, the updated first bias metric, and/or the updated second bias metric. For example, the first bias metric, the second bias metric, the updated first bias metric, and/or the updated second bias metric can be used as data labels to the first set of candidate profiles and/or the second set of candidate profiles to generate training data for the machine learning model. Thereafter, the machine learning model can be trained based on the training data and then executed at by the candidate selector 105 for a fairer candidate selection process. In some instances, the candidate selector can include multiple machine learning models. The multiple machine learning model can be bootstrap aggregate based on the first bias metric, the second bias metric, the updated first bias metric, and/or the updated second bias metric.

Figure 2:
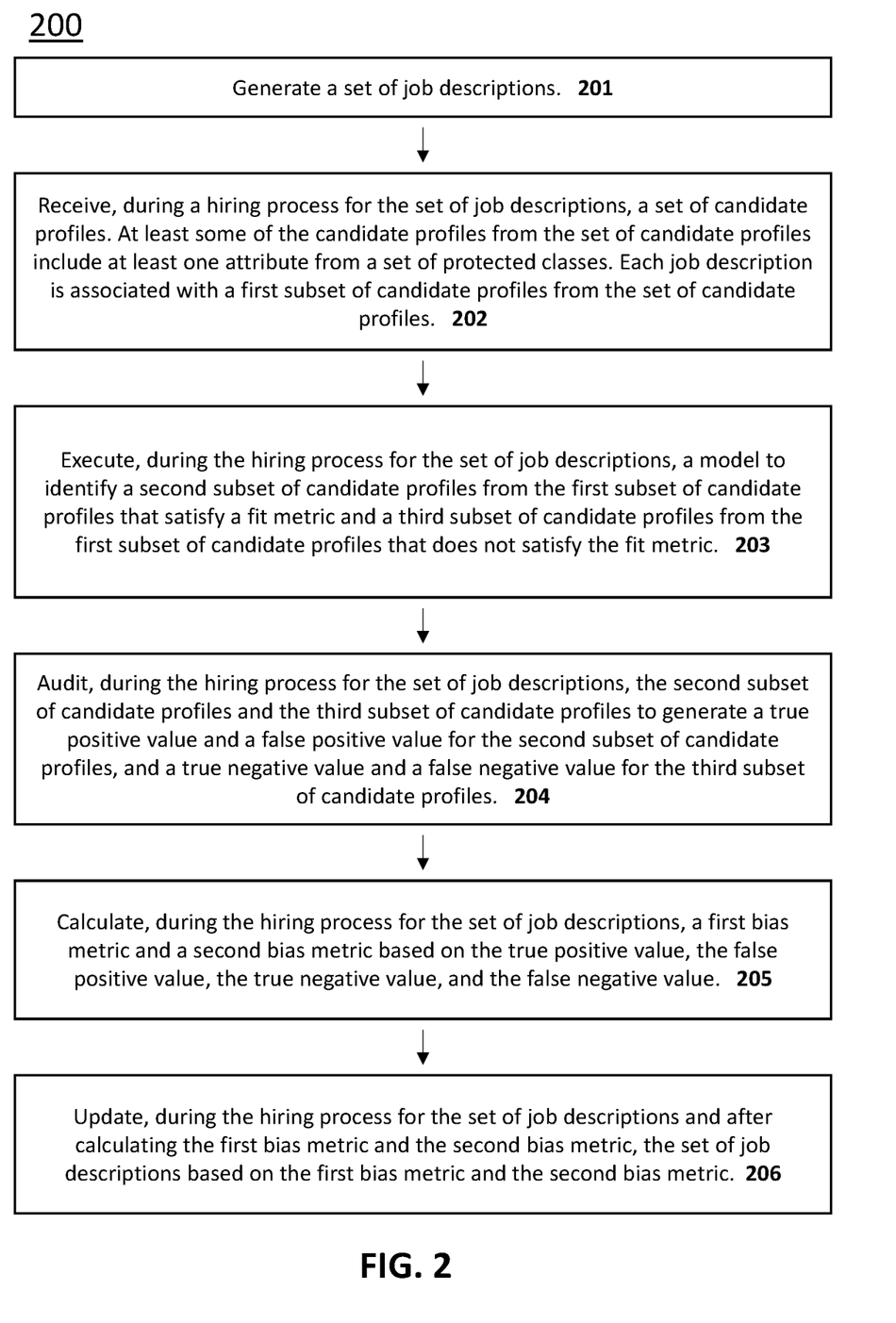
FIG. 2 is a flowchart of a method of assessing a bias in algorithmic matching of job candidates with job opportunities, according to an embodiment.

FIG. 2 is a flowchart showing a method 200 of assessing a bias in algorithmic matching of job candidates with job opportunities, according to an embodiment. In some implementations, a bias assessment device (such as the bias assessment device 101 as shown and described with respect to FIG. 1) can be used to perform the method 200. At 201, a set of job descriptions (e.g., a set of text documents that include job descriptions of job opportunities) are generated. The set of job descriptions can be generated by one or more users of the bias assessment device or, in some instances, can be generated by a natural language processing model. In some implementations, the set of job descriptions can be received (e.g., from a server device via the Internet). At 202, a set of candidate profiles are received (e.g., from personal computers of a set of job candidates applying for the job opportunities) during a hiring process for the set of descriptions. Each candidate from the set of candidates has at least one attribute from at least one protected class (e.g., based on gender, pregnancy, race, age, disability, color, creed, national origin, religion, genetic information, and/or the like) Each job description from the set of job descriptions can be associated with a first subset of candidate profiles from the set of candidate profiles.

At 203, a model is executed, during the hiring process for the set of descriptions, to identify a second subset of candidate profiles from the first subset of candidate profiles that satisfy a fit metric and a third subset of candidate profiles from the first subset of candidate profiles that does not satisfy the fit metric. In one example, in some instances, the model can be a rule-based model that calculates fit metric based on similarity of candidate profiles to job descriptions. In another example, in some instances, the model can be a machine learning model that is trained on labeled training data including candidate profiles and fit metrics. In yet another example, the model can include the rule-based model and the machine learning model to identify the second subset of candidate profiles and the third subset of candidate profiles.

At 204, the second subset of candidate profiles and the third subset of candidate profiles are audited, during the hiring process for the set of job descriptions, to generate a true positive value and a false positive value for the second subset of candidate profiles, and a true negative value and a false negative value for the third subset of candidate profiles. The true positive values, true negatives values, false positive values, and false negative values can be generated for a first protected class and a second protected class (e.g., or any suitable number of protected class). In some instances, a number of protected classes can be assigned by a user of the bias assessment device 101.

At 205, a first bias metric and a second bias metric is then calculated, during the hiring process for the set of job descriptions, based on the true positive value, the false positive value, the true negative value, and the false negative for each of the protected classes. As a result, $TPR_1$ can be calculated using a true positive value for the first protected class ($TP_1$) and a false negative value for the first protected class ($FN_1$) by equation:

$$TPR_1 = \frac{TP_1}{TP_1 + FN_1}.$$

$FPR_1$ can be calculated using a false positive value for the first protected class ($FP_1$) and a true negative value for the first protected class ($TN_1$) by equation:

$$FPR_1 = \frac{FP_1}{FP_1 + TN_1}.$$

$TPR_2$ can be calculated using a true positive value for the first protected class ($TP_2$) and a false negative value for the first protected class ($FN_2$) by equation:

$$TPR_2 = \frac{TP_2}{TP_2 + FN_2}.$$

Finally, $FPR_2$ can be calculated using a false positive value for the first protected class ($FP_2$) and a true negative value for the first protected class ($TN_2$) by equation:

$$FPR_2 = \frac{FP_2}{FP_2 + TN_2}.$$

Thereafter, the first bias metric can be calculated by:

$$\text{metric} = \left(\frac{\mu_{TPR}^{-1} + \mu_{FPR}^{-1}}{2}\right)^{-1},$$

where $$\mu_{TPR} = \frac{\sum_{i=1}^{N}|TPR_1 - TPR_2|_i}{N}$$

and $$\mu_{FPR} = \frac{\sum_{i=1}^{N}|FPR_1 - FPR_2|_i}{N}.$$

The second bias metric can be equal to the $\mu_{TPR}$ (the mean true positive rate) as described above in further details.

At 206, the set of job descriptions are updated, during the hiring process for the set of job descriptions and after calculating the first bias metric and the second bias metric, based on the first bias metric and the second bias metric. For example, in some instances, a natural language processing model can be used to generate the updated job description based on the job description and the first bias metric and/or the second bias metric to reduce a diversity bias (e.g., a gender bias, an ethnicity bias, etc.) in the job description.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be used, and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages, packages, and software development tools.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-transitory processor-readable medium storing code representing instructions to be executed by a processor, the code comprising code to cause the processor to:

generate a set of job descriptions;

receive, from a set of remote compute devices associated with a set of job candidates, a set of candidate profiles having at least one attribute from a plurality of protected classes, each job description from the set of job descriptions being associated with a first subset of candidate profiles from the set of candidate profiles;

generate a subset of formatted candidate profiles having a standardized format and from the first subset of candidate profiles;

execute a machine learning model to identify a second subset of candidate profiles from the subset of formatted candidate profiles that satisfy a fit metric and a third subset of candidate profiles from the subset of formatted candidate profiles that does not satisfy the fit metric;

generate a true positive value and a false positive value for the second subset of candidate profiles, and a true negative value and a false negative value for the third subset of candidate profiles, based on the second subset of candidate profiles and the third subset of candidate profiles;

calculate a first bias metric and a second bias metric based on the true positive value and the false positive value for the second subset of candidate profiles, and the true negative value and the false negative value for the third subset of candidate profiles, the first bias metric is calculated by equation:

$$\text{metric} = \left(\frac{\mu_{TPR}^{-1} + \mu_{FPR}^{-1}}{2}\right)^{-1},$$

wherein $$\mu_{TPR} = \frac{\sum_{i=1}^{N}|TPR_1 - TPR_2|_i}{N}$$

and $$\mu_{FPR} = \frac{\sum_{i=1}^{N}|FPR_1 - FPR_2|_i}{N},$$

N is the number of job descriptions in the set of job descriptions, $TPR_1$ is true positive rate for a first protected class from the plurality of protected classes, $TPR_2$ is true positive rate for a second protected class from the plurality of protected classes, $FPR_1$ is false positive rate for the first protected class from the plurality of protected classes, and $FPR_2$ is false positive rate for the second protected class from the plurality of protected classes;

retrain the machine learning model based on the second subset of candidate profiles and the third subset of candidate profiles after calculating the first bias metric and the second bias metric;

update, in response to at least one of the first bias metric or the second bias metric being outside a predetermined acceptable range, the set of job descriptions based on the first bias metric and the second bias metric to generate an updated set of job descriptions different than the set of job descriptions;

receive an updated set of candidate profiles different than the set of candidate profiles; and calculate, after retraining the machine learning model, an updated first bias metric and an updated second bias metric for the updated set of candidate profiles, the updated first bias metric and the updated second bias metric being within the predetermined acceptable range.

2. The non-transitory processor-readable medium of claim 1, wherein the set of job descriptions is a first set of job descriptions and the set of candidate profile is a first set of candidate profiles, the medium further storing code to:

identify a second set of job descriptions and a second set of candidate profiles, each job description from the second set of job descriptions being associated with a fourth subset of candidate profiles from the second set of candidate profiles, the second set of job description being previously applied to using the second subset of candidate profiles from the first set of candidate profiles;

execute the machine learning model to identify a fifth subset of candidate profiles from the second subset of candidate profiles that satisfy the fit metric and a sixth subset of candidate profiles from the subset of formatted candidate profiles that does not satisfy the fit metric;

generate a true positive value and a false positive value for the fifth subset of candidate profiles, and a true negative value and a false negative value for the sixth subset of candidate profiles, based on the fifth subset of candidate profiles and the sixth subset of candidate profiles;

generate the first bias metric and the second bias metric based on the true positive value and the false positive value for the fifth subset of candidate profiles, and the true negative value and the false negative value for the sixth subset of candidate profiles to generate an updated first bias metric and an updated second bias metric; and update the first set of job descriptions based on at least one of the updated first bias metric or the updated second bias metric.

3. The non-transitory processor-readable medium of claim 1, wherein the set of candidate profiles is a first set of candidate profiles, the machine learning model includes at least one neural network, and non-transitory processor-readable medium further stores code to:

synthetically generate the first set of candidate profiles from a second set of candidate profiles smaller than the first set of candidate profiles, the first set of candidate profiles including a first pair of candidate profiles with different amounts of brightness and a second pair of candidate profiles with different amounts of noise; and train the neural network using a training dataset that includes the first set of candidate profiles $$\text{metric} = \left(\frac{\mu_{TPR}^{-1} + \mu_{FPR}^{-1}}{2}\right)^{-1},$$

$$\mu_{TPR} = \frac{\sum_{i=1}^{N}|TPR_1 - TPR_2|_i}{N} - \mu_{FPR} = \frac{\sum_{i=1}^{N}|FPR_1 - FPR_2|_i}{N},$$

$$-NTPR_1 TPR_2 FPR_1 - FPR_2.$$

4. The non-transitory processor-readable medium of claim 1, wherein:

$TPR_1$ is calculated using a true positive value for the first protected class ($TP_1$) and a false negative value for the first protected class ($FN_1$) by equation:

$$TPR_1 = \frac{TP_1}{TP_1 + FN_1},$$

$FPR_1$ is calculated using a false positive value for the first protected class ($FP_1$) and a true negative value for the first protected class ($TN_1$) by equation:

$$FPR_1 = \frac{FP_1}{FP_1 + TN_1},$$

$TPR_2$ is calculated using a true positive value for the first protected class ($TP_2$) and a false negative value for the first protected class ($FN_2$) by equation:

$$TPR_2 = \frac{TP_2}{TP_2 + FN_2},$$

$FPR_2$ is calculated using a false positive value for the first protected class ($FP_2$) and a true negative value for the first protected class ($TN_2$) by equation:

$$FPR_2 = \frac{FP_2}{FP_2 + TN_2}.$$

5. The non-transitory processor-readable medium of claim 1, wherein the plurality of protected classes include at least one of a protected class based on gender, a protected class based on pregnancy, a protected class based on race, a protected class based on age, a protected class based on disability, a protected class based on color, a protected class based on creed, a protected class based on national origin, a protected class based on religion, or a protected class based on genetic information.

6. The non-transitory processor-readable medium of claim 1, wherein the machine learning model is retrained based on at least one of the first bias metric or the second bias metric.

7. The non-transitory processor-readable medium of claim 1, wherein the machine learning model includes a plurality of machine learning models, the non-transitory processor-readable medium further storing code to:
bootstrap aggregate the plurality of machine learning models based on at least one of the first bias metric or the second bias metric.

8. A method, comprising:
receiving, from a set of remote compute devices associated with a set of job candidates, a first set of job descriptions and a first set of candidate profiles, each candidate profile from the first set of candidate profiles having at least one attribute from a plurality of protected classes, each job description from the first set of job descriptions being associated with a first subset of candidate profiles from the first set of candidate profiles;
synthetically generate a set of synthetic candidate profiles, the synthetically generating including at least one of manipulating a brightness of at least one image from a first candidate profile from the first set of candidate profiles, adding noise to at least one image from a second candidate profile from the first set of candidate profiles, white-balancing at least one image from a third candidate profile from the first set of candidate profiles, translating text from a fourth candidate profile from the first set of candidate profiles, synonym-replacing text from a fifth candidate profile from the first set of candidate profiles, randomly permutating a sixth candidate profile from the first set of candidate profiles, or changing the at least one attribute of a seventh candidate profile from the first set of candidate profiles;
training, before a hiring process, a machine learning model using a training dataset that includes the first set of candidate profiles and the set of synthetic candidate profiles;
generating a subset of formatted candidate profiles having a standardized format and from the first subset of candidate profiles from the first set of candidate profiles;
executing the machine learning model to identify a second subset of candidate profiles from the subset of formatted candidate profiles that satisfy a fit metric and a third subset of candidate profiles from the subset of formatted candidate profiles that does not satisfy the fit metric;
generating a true positive value and a false positive value for the second subset of candidate profiles from the subset of formatted candidate profiles, and a true negative value and a false negative value for the third subset of candidate profiles from the subset of formatted candidate profiles, based on the second subset of candidate profiles and the third subset of candidate profiles;
calculating a first bias metric and a second bias metric based on the true positive value and the false positive value for the second subset of candidate profiles from the subset of formatted candidate profiles, and the true negative value and the false negative value for the third subset of candidate profiles from the subset of formatted candidate profiles;
tuning, during the hiring process, at least one parameter of the machine learning model based on the second subset of candidate profiles and the third subset of candidate profiles;
reporting, based on at least one of the first bias metric or the second bias metric, a fairness of the machine learning model such that a candidate associated with the candidate profile from the first set of candidate profiles is hired in response to the reporting of the fairness of the machine learning model;
identifying, during the hiring process and using the machine learning model after the tuning of the at least one parameter, a second set of job descriptions and a second set of candidate profiles, each job description from the second set of job descriptions being associated with a first subset of candidate profiles from the second set of candidate profiles, the second set of job descriptions associated with the second subset of candidate profiles from the subset of formatted candidate profiles;

executing, during the hiring process, the machine learning model to identify a second subset of candidate profiles from the first subset of candidate profiles from the second set of candidate profiles that satisfy the fit metric and a third subset of candidate profiles from the first subset of candidate profiles from the second set of candidate profiles that does not satisfy the fit metric;

generating, during the hiring process, a true positive value and a false positive value for the second subset of candidate profiles from the first subset of candidate profiles from the second set of candidate profiles, and a true negative value and a false negative value for the third subset of candidate profiles from the first subset of candidate profiles from the second subset of candidate profiles, based on the second subset of candidate profiles from the first subset of candidate profiles from the second set of candidate profiles and the third subset of candidate profiles from the first subset of candidate profiles form the second subset of candidate profiles;

updating, during the hiring process, the first bias metric and the second bias metric based on the true positive value and the false positive value for the second subset of candidate profiles from the first subset of candidate profiles from the second set of candidate profiles, and the true negative value and the false negative value for the third subset of candidate profiles from the first subset of candidate profiles from the second subset of candidate profiles, to generate an updated first bias metric and an updated second bias metric; and reporting, during the hiring process, the machine learning model as fair or unfair based on at least one of the updated first bias metric or the updated second bias metric.

9. The method of claim 8, further comprising:

modifying a brightness of a first image of a first candidate profile from the first set of candidate profiles to generate a brightness adjusted image;

modifying a noise amount of a second image of a second candidate profile from the first set of candidate profiles to generate a noise adjusted image; and training the machine learning model using the first set of candidate profiles, the brightness adjusted image, and the noise adjusted image.

10. The method of claim 8, wherein the first bias metric is calculated by equation:

$$\text{metric} = \left(\frac{\mu_{TPR}^{-1} + \mu_{FPR}^{-1}}{2}\right)^{-1},$$

wherein $$\mu_{TPR} = \frac{\sum_{i=1}^{N}|TPR_1 - TPR_2|_i}{N}$$

and $$\mu_{FPR} = \frac{\sum_{i=1}^{N}|FPR_1 - FPR_2|_i}{N},$$

N being the number of job descriptions in the set of job descriptions, $TPR_1$ being true positive rate for a first protected class from the plurality of protected classes, $TPR_2$ being true positive rate for a second protected class from plurality of protected classes, $FPR_1$ being false positive rate for the first protected class from the plurality of protected classes, and $FPR_2$ being false positive rate for the second protected class from the plurality of protected classes.

11. The method of claim 10, wherein:

$TPR_1$ is calculated using a true positive value for the first protected class ($TP_1$) and a false negative value for the first protected class ($FN_1$) by equation:

$$TPR_1 = \frac{TP_1}{TP_1 + FN_1},$$

$FPR_1$ is calculated using a false positive value for the first protected class ($FP_1$) and a true negative value for the first protected class ($TN_1$) by equation:

$$FPR_1 = \frac{FP_1}{FP_1 + TN_1},$$

$TPR_2$ is calculated using a true positive value for the first protected class ($TP_2$) and a false negative value for the first protected class ($FN_2$) by equation:

$$TPR_2 = \frac{TP_2}{TP_2 + FN_2},$$

$FPR_2$ is calculated using a false positive value for the first protected class ($FP_2$) and a true negative value for the first protected class ($TN_2$) by equation:

$$FPR_2 = \frac{FP_2}{FP_2 + TN_2}.$$

12. The method of claim 10, wherein the first bias metric is bound in an interval between 0 and 1.

13. The method of claim 10, wherein the $\mu_{TPR}$ is the second bias metric.

14. The method of claim 10, further comprising:

reporting the machine learning model as fair when an absolute difference between $TPR_1$ and $TPR_2$ or an absolute difference between $FPR_1$ and $FPR_2$ is less than a preset threshold.

15. The method of claim 8, wherein the plurality of protected classes include at least one of a protected class based on gender, a protected class based on pregnancy, a protected class based on race, a protected class based on age, a protected class based on disability, a protected class based on color, a protected class based on creed, a protected class based on national origin, a protected class based on religion, or a protected class based on genetic information.

16. The method of claim 8, further comprising:
tuning, during the hiring process, at least one parameter in the machine learning model based on at least one of the first bias metric or the second bias metric to improve the first bias metric or the second bias metric.

17. The method of claim 8, further comprising:
training the machine learning model based on at least one of the first bias metric or the second bias metric.

18. The method of claim 8, wherein the machine learning model includes a plurality of machine learning models, the method further comprising:
bootstrap aggregating the plurality of machine learning models based on at least one of the first bias metric or the second bias metric.

19. The method of claim 8, wherein tuning the at least one parameter of the machine learning model includes tuning the machine learning model using at least one of the first bias metric or the second bias metric.

20. A method, comprising:
receiving, from a set of remote compute devices associated with a set of job candidates, a set of job descriptions and a set of candidate profiles having at least one attribute from a plurality of protected classes, each job description from the set of job descriptions being associated with a first subset of candidate profiles from the set of candidate profiles;
generating, during a hiring process for the set of job descriptions, a subset of formatted candidate profiles having a standardized format and from the first subset of candidate profiles;
executing, during the hiring process for the set of job descriptions, one or more machine learning models to identify a second subset of candidate profiles from the subset of formatted candidate profiles that satisfy a fit metric and a third subset of candidate profiles from the subset of formatted candidate profiles that does not satisfy the fit metric;
generating, during the hiring process for the set of job descriptions, a true positive value and a false positive value for the second subset of candidate profiles, and a true negative value and a false negative value for the third subset of candidate profiles;
calculating, during the hiring process for the set of job descriptions, a set of bias metrics based on the true positive value and the false positive value for the second subset of candidate profiles, and the true negative value and the false negative value for the third subset of candidate profiles,
at least one bias metric from the set of bias metrics calculated by equation:

$$\text{metric} = \left(\frac{\mu_{TPR}^{-1} + \mu_{FPR}^{-1}}{2}\right)^{-1},$$

wherein $$\mu_{TPR} = \frac{\sum_{i=1}^{N}|TPR_1 - TPR_2|_i}{N}$$

and $$\mu_{FPR} = \frac{\sum_{i=1}^{N}|FPR_1 - FPR_2|_i}{N},$$

N being the number of job descriptions in the set of job descriptions, $TPR_1$ being true positive rate for a first protected class from the plurality of protected classes, $TPR_2$ being true positive rate for a second protected class from plurality of protected classes, $FPR_1$ being false positive rate for the first protected class from the plurality of protected classes, and $FPR_2$ being false positive rate for the second protected class from the plurality of protected classes;
reporting, during the hiring process for the set of job descriptions, a fairness of the one or more machine learning models based on the at least one bias metric;
tuning the one or more machine learning models based on the second subset of candidate profiles and the third subset of candidate profiles to generate one or more tuned machine learning models;
executing, the one or more tuned machine learning models to identify a fourth subset of candidate profiles from the subset of formatted candidate profiles and a fifth subset of candidate profiles from the subset of formatted candidate profiles; and
calculating, a second set of bias metrics based on the second subset of candidate profiles and the third subset of candidate profiles, the second set of bias metrics closer to a predetermined acceptable range than the first set of bias metrics.

* * * * *